United States Patent [19]
Groves

[11] Patent Number: 5,829,892
[45] Date of Patent: Nov. 3, 1998

[54] CENTER BEARING BRACKET AND SUPPORT

[75] Inventor: William R. Groves, Grand Rapids, Ohio

[73] Assignee: Dana Corporation, Toledo, Ohio

[21] Appl. No.: 883,682

[22] Filed: Jun. 27, 1997

[51] Int. Cl.[6] .................................................. F16C 19/06
[52] U.S. Cl. ............................................................ 384/537
[58] Field of Search ..................................... 384/537, 584, 384/441, 428, 438

[56] References Cited

U.S. PATENT DOCUMENTS

| | | |
|---|---|---|
| 2,135,902 | 11/1938 | Leister . |
| 2,211,295 | 8/1940 | Searles et al. . |
| 2,484,725 | 10/1949 | Parker . |
| 2,521,638 | 9/1950 | Lamm . |
| 2,536,424 | 1/1951 | Curtis . |
| 2,560,759 | 7/1951 | Evernden et al. . |
| 2,580,119 | 12/1951 | Meyers . |
| 2,893,790 | 1/1959 | Raes et al. . |
| 2,897,023 | 7/1959 | Burkhalter et al. . |
| 2,906,572 | 9/1959 | Wroby . |
| 2,933,354 | 4/1960 | Primeau . |
| 3,140,901 | 7/1964 | Young . |
| 3,166,362 | 1/1965 | Slaght . |
| 3,309,154 | 3/1967 | Stokely . |
| 3,382,017 | 5/1968 | Cripe . |
| 3,639,015 | 2/1972 | Mass . |
| 3,961,829 | 6/1976 | Bowen et al. . |
| 4,392,694 | 7/1983 | Reynolds . |
| 4,463,993 | 8/1984 | Brissette et al. . |
| 4,542,996 | 9/1985 | Brissette et al. . |
| 4,571,098 | 2/1986 | Rudnik . |
| 5,161,903 | 11/1992 | March . |

FOREIGN PATENT DOCUMENTS 617237  3/1961  Canada .
2172938  10/1986  United Kingdom .

OTHER PUBLICATIONS

Dana Drawing No. 230119 dated May 27,1954.
Dana Drawing No. 230164 dated Feb. 8,1955.

*Primary Examiner*—Lenard A. Footland
*Attorney, Agent, or Firm*—MacMillan, Sobanski & Todd

[57] ABSTRACT

A structure for retaining a bracket on a resilient support member for a center bearing assembly includes a bracket having a generally U-shaped body portion and a pair of outwardly extending end portions provided at the ends thereof. Respective apertures are formed through the end portions to permit the bracket to be secured to a cross member of a frame of a vehicle. A plurality of openings is formed through the body portion of the bracket. Each of the openings has axially forward and rearward tabs provided thereon which extend inwardly toward the center of the bracket. The center bearing assembly further includes a resilient support member having an enlarged axially extending opening formed through the center thereof. The outer surface of the support member is formed having a pair of outwardly extending protrusions and an outwardly extending nib. When the support member is installed in the bracket, portions of the axially forwardly and rearwardly facing surfaces of the support member are engaged respectively by the tabs to prevent the support member from moving axially forwardly or rearwardly relative to the bracket. At the same time, the outwardly extending protrusions and nib are received within the openings formed in the legs of the bracket to prevent the support member from being withdrawn upwardly from the bracket.

11 Claims, 2 Drawing Sheets

5,829,892

CENTER BEARING BRACKET AND SUPPORT

BACKGROUND OF THE INVENTION

This invention relates in general to bearings for supporting shafts for rotation and in particular to an improved structure for a center bearing assembly for rotatably supporting an intermediate portion of a vehicle drive line or coupling shaft assembly.

In most rear wheel drive vehicles, a source of rotational energy, such as an internal combustion or diesel engine, is located near the front of the vehicle. The engine is connected by means of a drive line to rotate one or more driven wheels, which are located near the rear of the vehicle. The drive line typically extends between a transmission, which is connected to the engine, and a differential, which is connected to the driven wheels. In some vehicles, the distance separating the transmission and the differential is relatively short. In these vehicles, the drive line is composed of a single tube, which is usually referred to as a drive shaft. In other vehicles, the distance separating the transmission and the differential is relatively long, making the use of a one-piece drive shaft impractical. In these vehicles, the drive line is composed of a drive shaft and one or more coupling shafts. The coupling shafts are connected to the drive shaft (and to each other) by universal joints.

Drive lines which are composed of a drive shaft and one or more coupling shafts usually require the use of one or more intermediate resilient support structures, typically referred to as center bearing assemblies. A typical center bearing assembly includes an annular ball bearing, within which the coupling shaft is rotatably supported. The ball bearing is disposed within a generally annular, resilient support member. The resilient support member is, in turn, disposed within a generally U-shaped bracket which is secured to a lower portion of the vehicle frame, such as a cross member extending between the side rails of the vehicle frame. The resilient support member is provided to reduce vibrations of the drive line in the vicinity of the center bearing assembly and to prevent any such vibrations from being transmitted to the vehicle frame. Many center bearing assembly structures of this general type are known in the art.

As is commonly known in modern vehicle manufacturing methods, the drive shaft, the coupling shafts, and the center bearing assemblies are frequently fabricated in one location, stored in a second location, then shipped to a third location for assembly into the vehicle frame. Because the ball bearings and the resilient support members of the center bearing assemblies are annular in shape, they cannot be accidentally removed from the coupling shaft during storage and shipment. However, the U-shaped brackets which secure the ball bearings and the resilient support members to the vehicle frame can be accidentally removed if not restrained. A number of such bracket restraints are known in the art for preventing the bracket from becoming dislodged from the remainder of the center bearing assembly. Nonetheless, it would be desirable to provide an improved structure for retaining these U-shaped brackets on their associated center bearing assemblies which is simple and inexpensive in structure and construction.

SUMMARY OF THE INVENTION

This invention relates to an improved structure for retaining a bracket on a resilient support member for a center bearing assembly. The bracket includes a generally U-shaped body portion having a pair of outwardly extending end portions provided at the ends thereof. Respective apertures are formed through the end portions to permit the bracket to be secured to a cross member of a frame of a vehicle. A plurality of openings is formed through the body portion of the bracket. Each of the openings has axially forward and rearward tabs provided thereon which extend inwardly toward the center of the bracket. The center bearing assembly further includes a resilient support member having an enlarged axially extending opening formed through the center thereof. The outer surface of the support member is formed having a pair of outwardly extending protrusions and an outwardly extending nib. When the support member is installed in the bracket, portions of the axially forwardly and rearwardly facing surfaces of the support member are engaged respectively by the tabs to prevent the support member from moving axially forwardly or rearwardly relative to the bracket. At the same time, the outwardly extending protrusions and nib are received within the openings formed in the legs of the bracket to prevent the support member from being withdrawn upwardly from the bracket.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
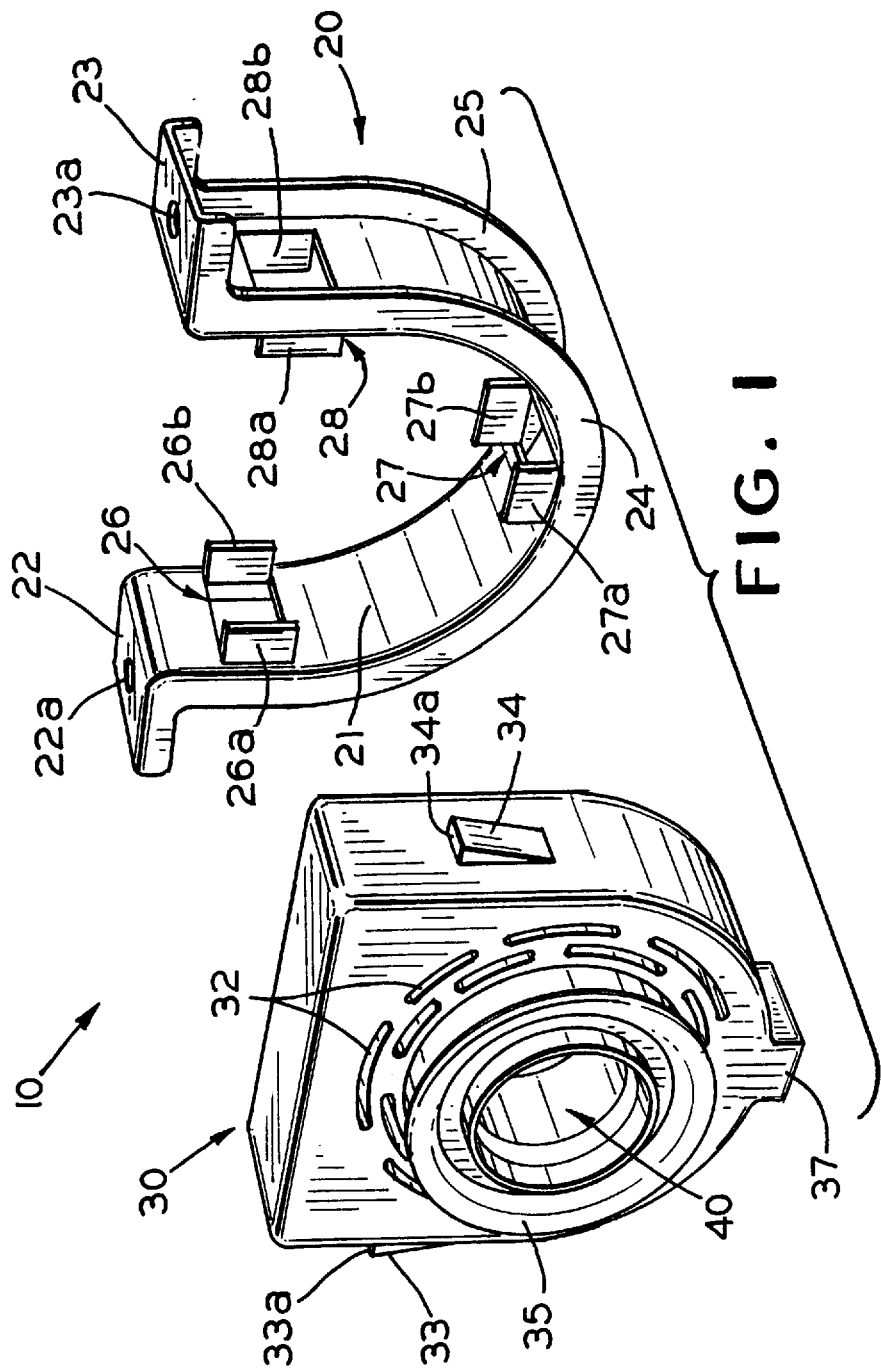
FIG. 1 is an exploded perspective view of a center bearing assembly in accordance with this invention.
Figure 2:
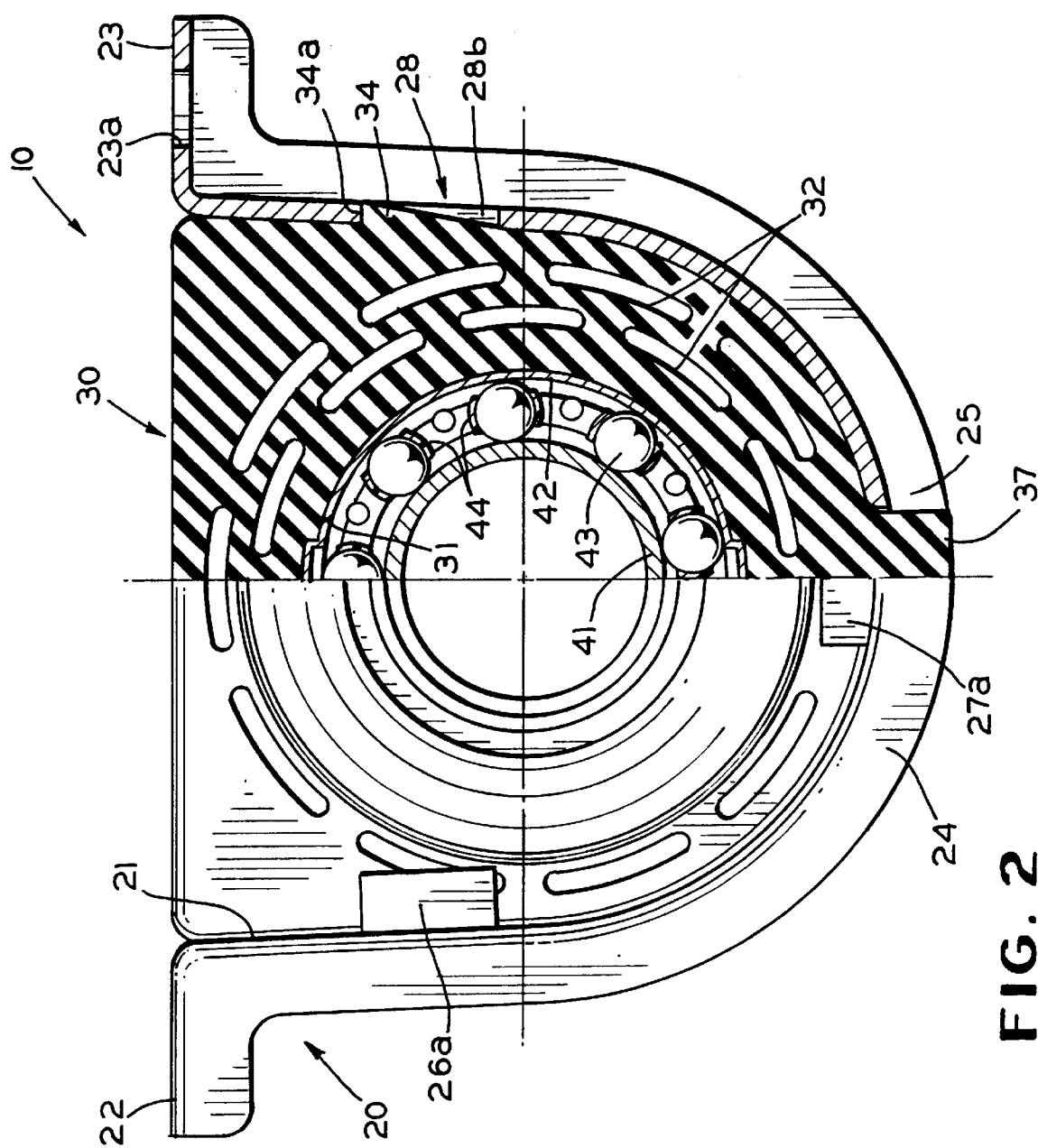
FIG. 2 is a front elevation view, partially in cross section, of the assembled center bearing assembly illustrated in FIG. 1.

Referring now to the drawings, there is illustrated in FIGS. 1 and 2 a center bearing assembly, indicated generally at 10, in accordance with this invention. As is well known in the art, the center bearing 10 is adapted to be secured to a cross member (not shown) or other portion of a frame of a vehicle or other support member so as to rotatably support a shaft (not shown) or other component for rotation. The general structure and operation of the center bearing assembly 10 is well known in the art and, for the sake of brevity, will not be repeated herein. U.S. Pat. No. 4,392,694 to Reynolds, owned by the assignee of this invention, discusses the general structure and operation of center bearing assemblies, and the disclosure thereof is incorporated herein by reference.

The center bearing assembly 10 includes a bracket, indicated generally at 20. The bracket 20 includes a generally U-shaped body portion 21 including a curved center and a pair of straight legs. The legs of the body portion 21 of the bracket 20 have a pair of outwardly extending end portions 22 and 23 provided at the ends thereof. Respective apertures 22a and 23a are formed through the end portions 22 and 23. As will be explained in further detail below, the apertures 22a and 23a are provided to facilitate the securement of the bracket 20 to the cross member of the frame of the vehicle. A pair of outwardly extending circumferential flange portions 24 and 25 are provided through the lengths of the body portion 21 and the end portions 22 and 23 of the bracket 20. The flange portions 24 and 25 are provided to stiffen and strengthen the bracket 20.

As best shown in FIG. 1, a plurality of openings, indicated generally at 26, 27, and 28, are formed through the body portion 21 of the bracket 20. The first opening 26 is located near the center of the first leg of the body portion 21. The first opening 26 is preferably formed by punching slits through body portion 21 of the bracket 20, then bending tabs 26a and 26b inwardly toward the center of the U-shaped body portion 21. The tabs 26a and 26b, therefore, are located on the forward and rearward axial ends of the first opening 26. The second opening 27 is located near the center of the curved center of the body portion 21, while the third opening 28 is located near the center of the second leg of the body portion 21. The second and third openings 27 and 28 may be formed in the same manner as the first opening 26. As a result, the second opening 27 is defined by a pair of tabs 27a and 27b, while the third opening 28 is defined by a pair of tabs 28a and 28b. The purposes of the openings 26, 27, and 28 and their respective pairs of tabs, 26a and 26b, 27a and 27b, and 28a and 28b will be explained below.

The center bearing assembly 10 further includes an elastomeric support member, indicated generally at 30. The support member 30 has an enlarged axially extending opening 31 formed through the center thereof. The purpose of this opening will be explained below. About the central opening 31, a plurality of arcuate slots 32 are preferably formed through the support member 30. The slots 32 are preferably arranged in two concentric circular rows about most of the opening 31 and are preferably radially staggered throughout. The slots 32 provide an added measure of flexibility to the elastomeric support member 30.

The outer surface of the support member 30 is formed having a pair of outwardly extending protrusions 33 and 34. As best shown in FIG. 2, these protrusions 33 and 34 are preferably formed integrally with the support member 30 and are located on opposite sides thereof The illustrated protrusions 33 and 34 are generally ramp-shaped in cross section, having an outer surface which tapers outwardly from the support member 30 as it progresses upwardly from bottom to top. The protrusions 33 and 34 terminate in respective end surfaces 33a and 34a which extend directly outwardly from the body of the support member 30. Although two generally ramp-shaped protrusions 33 and 34 are illustrated, it will be appreciated that the size, shape, location, and number of such protrusions may vary as desired.

The outer surface of the support member 30 is also formed having an outwardly extending nib 37. Preferably, the nib 37 is formed integrally with the body of the support member 30 and has a cross sectional shape which is approximately the same as the cross sectional shape of the second opening 27 formed through the curved center of the body portion 21 of the bracket 20. Thus, the illustrated nib 37 is generally rectangular in cross sectional shape and has the same axial thickness as the body of the support member 30. However, the nib 37 may be formed having other shapes as desired.

The support member 30 is sized to be received within the U-shaped body portion 21 of the bracket, as shown in FIG. 2. This is accomplished by initially positioning the support member 30 above the bracket 20 in axial alignment with the spaced defined between the tabs 26a and 26b, 27a and 27b, and 28a and 28b. Then, the support member 30 is moved downwardly within the bracket 20 to the position illustrated in FIG. 2. When installed in this manner, portions of the axially forwardly facing surface of the support member 30 are engaged respectively by the tabs 26a, 27a, and 28a. Similarly, portions of the axially rearwardly facing surface of the support member 30 are engaged respectively by the tabs 26b, 27b, and 28b. Thus, the tabs 26a, 26b, 27a, 27b, 28a, and 28b prevent the support member 30 from moving axially forwardly or rearwardly relative to the bracket 20.

At the same time, the outwardly extending protrusions 33 and 34 are received within the first and third openings 26 and 28, respectively, formed in the legs of the body portion 21 of the bracket 20. During the installation process, such protrusions 33 and 34 are compressed as they slide along the inner surface of the body portion 21 of the bracket 20. When the support member 30 is properly positioned within the bracket 20 as shown in FIG. 2, the protrusions 33 and 34 resiliently snap outwardly into the openings 26 and 28. When this occurs, the end surfaces 33a and 34a of the protrusions 33 and 34 abut the edges of the openings 26 and 28. As a result, the protrusions 33 and 34 prevent the support member 30 from being withdrawn upwardly from the bracket 20. Similarly, the nib 37 is received within the second opening 27 formed through the curved center of the body portion 21 of the bracket 20. The engagement of the protrusions 33 and 34 and the nib 37 with the associated portions of the body portion 21 of the bracket 20 also function to prevent the support member 30 from moving axially forwardly or rearwardly relative to the bracket 20.

As shown in FIG. 1, the axially forwardly facing end of the support member 30 may be formed having a conventional flexible lip 35 thereon. The flexible lip 35 can extend into an annular region defined by a conventional annular shield (not shown). The flexible lip 35 and the annular shield are provided to minimize the entry of dirt and other contaminants into the components of the center bearing assembly 10. A similar flexible lip (not shown) and annular shield (not shown) may be provided on the axially rearwardly facing end of the support member 30. Also, the center bearing assembly 10 may be provided with a conventional slinger (not shown) for the purpose of further minimizing the entry of dirt and other contaminants into the components of the center bearing assembly 10.

Lastly, the bearing assembly 10 includes a conventional ball bearing, indicated generally at 40. The ball bearing 40 includes an inner race 41, and outer race 42, and a plurality of balls 43 disposed therebetween. A plastic or similar material cage 44 may be provided between the inner race 41 and the outer race 42 to retain the balls 43 therein. The inner race 41 is adapted to engage and support a rotatable shaft (not shown) therein, while the outer race 42 is mounted within the central axial opening 31 formed through the support member 30. In a manner which is well known in the art, the balls 43 permit the inner race 41 (and the shaft supported therein) to rotate relative to the outer race 42 (and the remainder of the center bearing assembly 10).

Typically, the center bearing assembly 10 is assembled onto a coupling shaft at the point of manufacture thereof. Then, the entire coupling shaft assembly (including the center bearing assembly 10) can be stored or shipped to another location. The cooperation of the protrusions 33 and 34 with the openings 26 and 28 prevents the bracket 20 from becoming radially dislodged during storage and shipment. Later, the center bearing assembly 10 can be secured to the cross member of the frame of the vehicle or other surface by means of conventional threaded fasteners (not shown) which extend upwardly through the apertures 22a and 23a formed through the flange portions 22 and 23 of the bracket 20.

This invention has been explained and illustrated as having openings 26, 27, and 28 formed completely through the legs of the bracket 20 in FIGS. 1 and 2, as well as having openings 56 and 57 formed completely through the legs of the bracket 50 in FIG. 3. It will be appreciated, however, that these openings need not be formed completely through the legs of the respective brackets. Rather, such openings may be embodied as recesses formed in the inner surfaces of the legs of the brackets. The outwardly extending protrusions formed on the support members could cooperate with such recesses without having to extend completely through the legs of the brackets. Thus, as used herein, the term "openings" includes both openings formed completely through the legs of the brackets and recesses formed in such legs. Also, the outwardly extending circumferential flange portions 24 and 25 and the tabs, 26a and 26b, 27a and 27b, and 28a and 28b may be replaced by inwardly extending circumferential flange portions (not shown) provided through the lengths of the body portion 21 and the end portions 22 and 23 of the bracket 20.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A bearing assembly for rotatably supporting a shaft on a support surface comprising:
    a bracket including a center and a pair of legs extending from the center that are adapted to be secured to the support surface, said bracket having openings formed through said center and one of said legs;
    a support member disposed within said legs of said bracket, said support member including an outwardly extending nib formed thereon that extends into said opening formed through said center of said bracket for preventing said support member from moving axially relative to said bracket, said support member further including an outwardly extending protrusion formed thereon that extends into said opening formed through said leg of said bracket for preventing said support member from moving radially relative to said bracket, said support member having a central opening formed therethrough; and
    a bearing mounted within said central opening of said support member, said bearing adapted to rotatably support the shaft therein.

2. The bearing assembly defined in claim 1 wherein said bracket has openings formed through said center and both of said legs.

3. The bearing assembly defined in claim 1 further including means for preventing said support member form moving axially relative to said bracket.

4. The bearing assembly defined in claim 3 wherein said means for preventing axial movement includes at least one tab formed on each axial side of said bracket, said tabs extending over portions of the opposite axial sides of said support member.

5. The bearing assembly defined in claim 4 wherein said tabs are formed adjacent to each of said openings.

6. The bearing assembly defined in claim 1 wherein said protrusion is generally shaped in the form of a ramp.

7. The bearing assembly defined in claim 2 wherein said outwardly extending protrusion formed on said support member is a first outwardly extending protrusion, and wherein said support member further includes a second outwardly extending protrusion formed thereon, said first and second outwardly extending protrusions extending into said openings formed through said legs of said bracket for preventing said support member from moving radially relative to said bracket.

8. The bearing assembly defined in claim 7 wherein each of said protrusions is generally shaped in the form of a ramp.

9. The bearing assembly defined in claim 7 further including means for preventing said support member form moving axially relative to said bracket.

10. The bearing assembly defined in claim 9 wherein said means for preventing axial movement includes at least one tab formed on each axial side of said bracket, said tabs extending over portions of the opposite axial sides of said support member.

11. The bearing assembly defined in claim 10 wherein said tabs are formed adjacent to each of said openings.

* * * * *